June 18, 1940.  G. E. HUBBELL ET AL  2,205,199
SEDIMENTATION
Filed Aug. 20, 1937  4 Sheets-Sheet 3
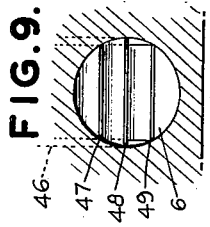
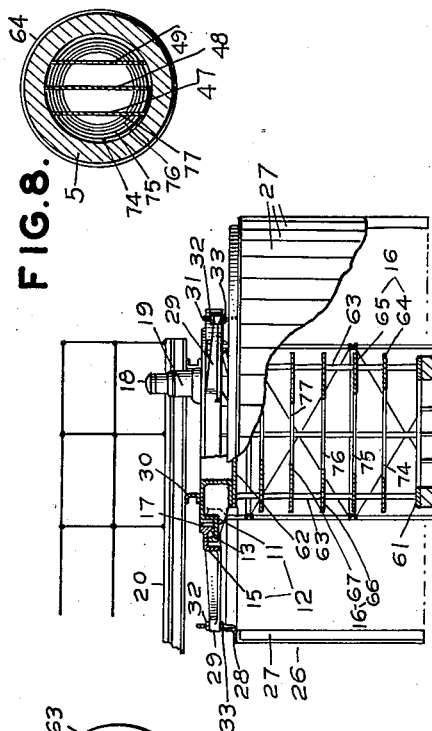
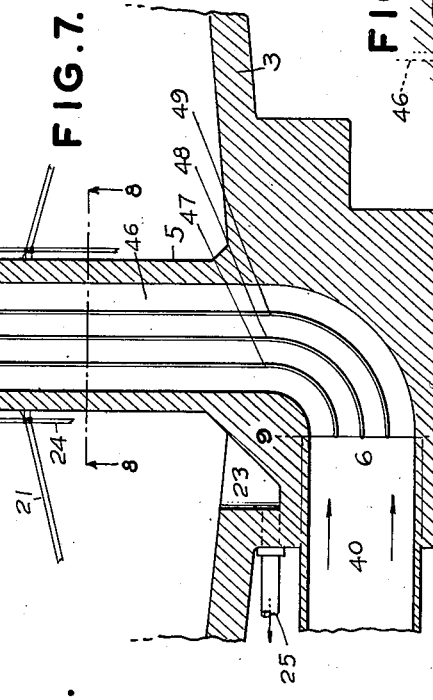
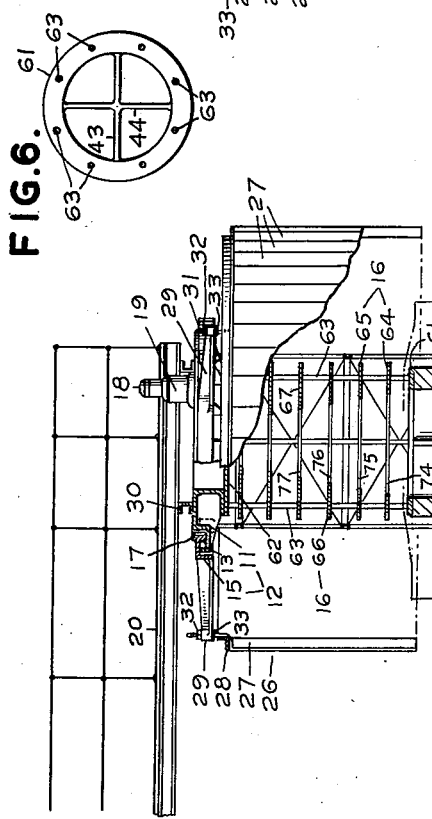
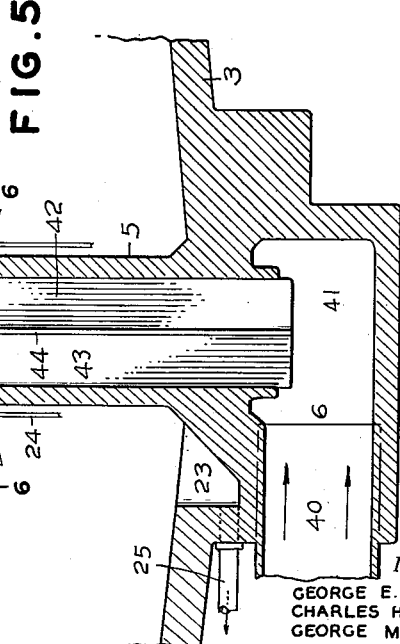
INVENTORS
GEORGE E. HUBBELL
CHARLES H. SCOTT
GEORGE M. DARBY
BY
Arthur Middleton
ATTORNEY.

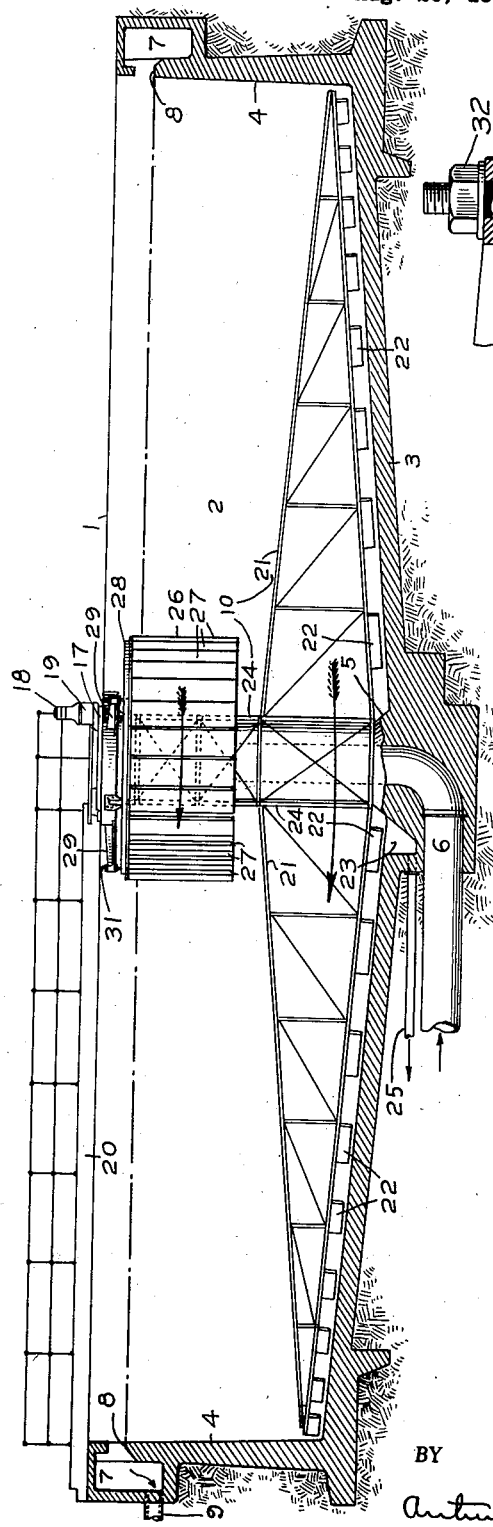
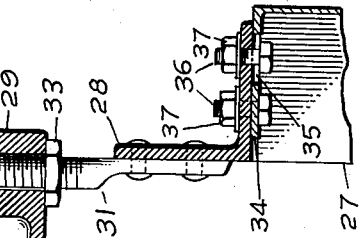
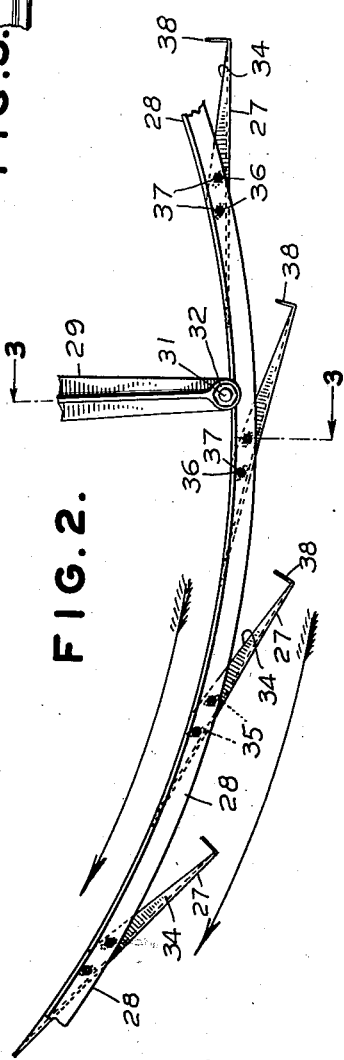

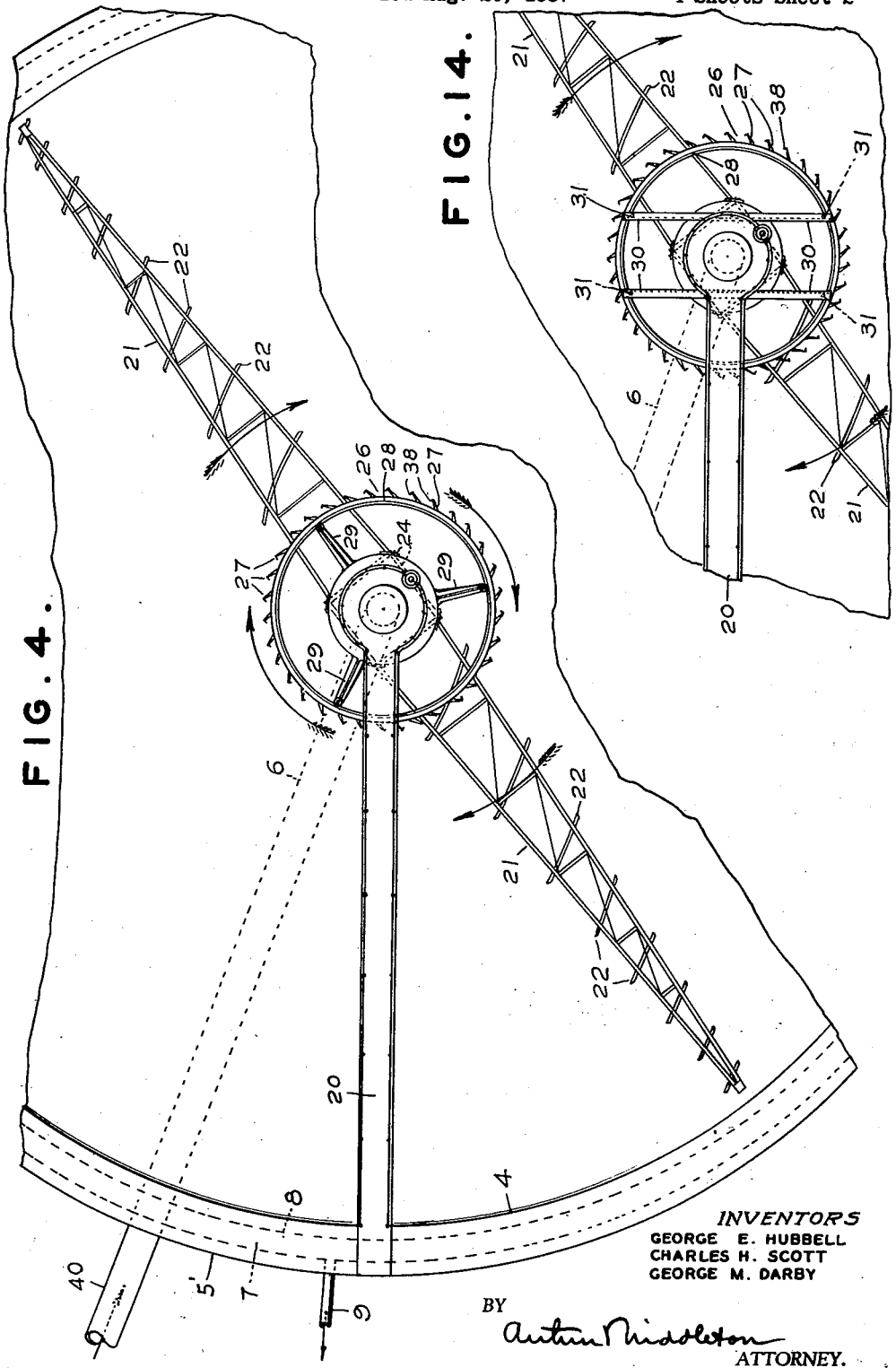

June 18, 1940.　　　G. E. HUBBELL ET AL　　　2,205,199
SEDIMENTATION
Filed Aug. 20, 1937　　　　4 Sheets-Sheet 4
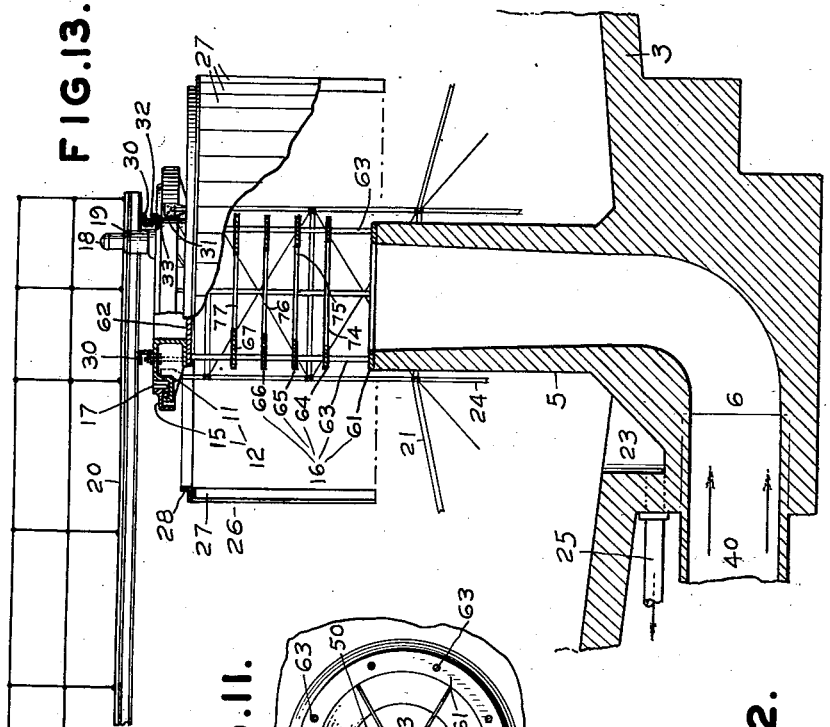
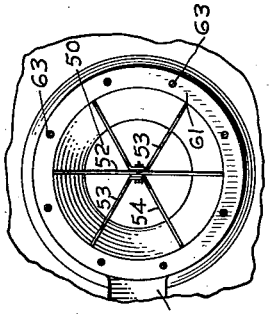
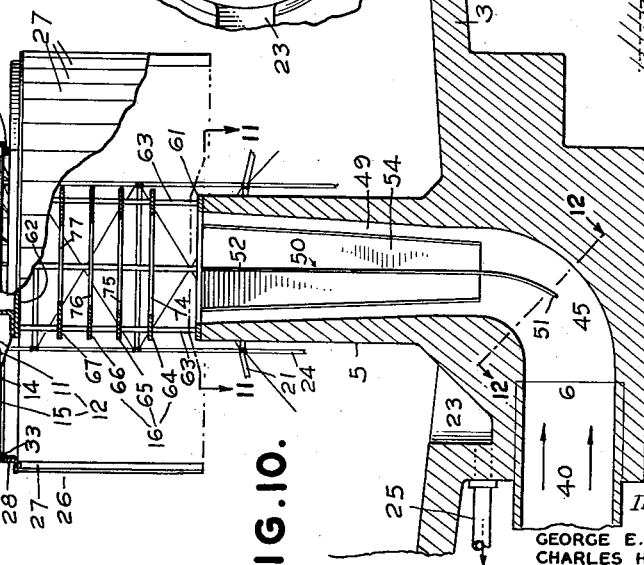
INVENTORS
GEORGE E. HUBBELL
CHARLES H. SCOTT
GEORGE M. DARBY
BY
Arthur Middleton
ATTORNEY.

Patented June 18, 1940

2,205,199

UNITED STATES PATENT OFFICE 2,205,199

SEDIMENTATION

George E. Hubbell, Detroit, Mich., and Charles H. Scott, Norwalk, and George M. Darby, Westport, Conn.; said Scott and said Darby assignors to The Dorr Company, Inc., New York, N. Y., a corporation of Delaware Application August 20, 1937, Serial No. 160,068

10 Claims. (Cl. 210—55)

This invention relates to settlers or subsidence tanks in which are treated liquids having solids in suspension. If the liquid is to be clarified by causing solids in suspension therein to settle onto the bottom of the tank for ultimate removal with the result that a clarified effluent overflows to discharge from the tank, such an apparatus is usually called a clarifier. If, however, the liquid being treated contains solids in suspension that are desired to be settled and withdrawn from the settler in the form of a thickened or dewatered pulp, and the excess water to be discarded passes from the settler as effluent, then the apparatus is usually referred to as a thickener. Sometimes an intermediate action is desired such as to have larger or heavier suspended solids settle for discharge as a thickened pulp and smaller size or relatively lighter suspended solids to pass out from the settler with the effluent. Such an apparatus is called a hydroseparator.

In the operation of such specific devices to which the generic name settler is applied herein, the sediment formed on the bottom of the tank is made up of solids which were in suspension in the incoming feed, and are impelled toward a discharge outlet from the settler by some type of continual removal mechanism. This applies irrespective of the shape of the tank as being round, rectangular or square. The effluent or supernatant treated liquid, from which the suspended solids have been settled out, is found in the top zone of the settler and in its treated form overflows to discharge from the settler.

The trend lately has been that in round or square tanks the mechanism that impels the sediment to discharge is movable about a vertical axis and derives at least some of its support from a central pier upstanding in the tank. With such a tank it has become the fashion, if not the practical necessity, of feeding the incoming liquid upwardly through the pier which has a hollow portion from which the feed is emitted more or less radially. The feed gets into the hollow portion of the pier through a conduit beneath the tank that connects the hollow portion of the pier through some source of feed supply.

A problem encountered in such a settler, especially when used in clarification of liquids that are polluted by light or flocculent suspended solids, is to distribute the incoming feed in a way to cause a minimum disturbance of the gravitational sedimentation effects that continually proceed within the tank. The liquid at the top of the tank is substantially finished of its clarification treatment and is ready to be discharged as one end product of the tank. Therefore, it is important that this finished supernatant liquid not be re-polluted with incoming feed carrying suspended solids with it. So one aim is to direct or deflect the incoming feed away from the finished supernatant layer in the tank. On the other hand, solids that were suspended and have been subjected in the tank to sedimentation processes have settled to the botom of the tank as sediment. As sediment, the traveling rakes impel it to discharge under such conditions of slight molestation that the sediment is not rediffused into the liquid being treated in the tank. It becomes important that the feed to the tank incoming through the hollow pier shall not be directed downwardly to an extent that would disturb or rediffuse the sediment into dispersion. So one object of this invention is to devise an arrangement by which feed incoming to a mechanically- cleaned settler through a hollow pier can be controllably directed and distributed selectively to the middle horizontal zone of a settler in a manner to avoid polluting the supernatant liquid in the settler or tend to avoid disturbing the settled sediment on the bottom of the settler. It has been found that the forces operating in a settler to sediment or settle solids in suspension are delicately balanced forces whose equilibrium is easily upset. If eddies are present or a current flow is set up, such as by convection, the settling efficiency of the settler is decreased. Accordingly, another object of this invention is to supply the incoming feed from the hollow pier to the tank contents in a manner by which its distribution can be controlled as to velocities and direction under such conditions that the gravitational sedimentation forces are interfered with to a minimum extent.

In supplying incoming liquid through a conduit that extends substantially horizontally under the settler bottom and then upwardly through the hollow pier and finally out through ports from the pier, the change of direction of flow of the incoming liquid is troublesome. It interferes with good sedimentation. So another object of this invention is to control the current and flow conditions within the stream of incoming feed as it passes to and through the hollow pier as well as therefrom.

This invention therefore may be said to involve in its broader sense the careful control of the current flow and distribution of the incoming feed both as it passes along its influent conduit and after emission therefrom into the liquid contents of the settler.

The invention is embodied in an apparatus for use in settlers as above described and comprises means for association with the incoming feed conduit to overcome disturbances or distortional flows in the incoming feed due to change of direction of flow in getting the liquid to be treated into the tank. It is also embodied in an apparatus for association with the pier of the settler for acting upon the feed after it is emitted from the center pier to control its distdibution into the tank contents.

The invention may be viewed more particularly as directed to a new form of liquid-distributing-cage construction for the pier, also to an arrangement by which flow-equalizing means are provided for the feed supplied to said cage.

Other features of the invention may be viewed as directed to the combined deflecting and stilling well or feed well construction for outer association with the hollow pier and more particularly to a substantially annular construction provided by overlapping units of tangentially-arranged deflector or vane-like members, that between them provide tuyères that are tangentially-disposed and substantially vertically-disposed.

This arrangement may also be described as an open cylinder with longitudinally-extending tangentially-directed vanes on inclined planes for deflecting in practically all directions at resultant angles incoming liquid that is impinged upon the vanes by or from the distributing cage or its equivalent.

Other objects or aspects of the invention relate to the combining or association of any two or more of the novel features above referred to and to any novel combination of the features above mentioned.

The invention possesses other objects, aspects and features of advantage, some of which with the foregoing will be set forth in the following description. In the following description and in the claims, parts will be identified by specific names for convenience, but they are intended to be as generic in their application to similar parts as the art will permit. In the accompanying drawings there have been illustrated the best embodiments of the invention known to me, but such embodiments are to be regarded as typical only of many possible embodiments, and the invention is not to be limited thereto.

The novel features considered characteristic of my invention are set forth with particularity in the appended claims. The invention itself, however, both as to its organization and its method of operation, together with additional objects and advantages thereof, will best be understood from the following description of a specific embodiment when read in connection with the accompanying drawings which constitute a part of this specification.

In the drawings Fig. 1 shows a vertical view, primarily in section of a sedimentation apparatus of the type to which the present invention is applicable.

Fig. 2 shows a plan view showing in detail a portion of the feed-well construction and a portion of the carrying frame therefor.

Fig. 3 shows a vertical section of a portion of the feedwell construction and of the carrying frame therefor, taken as on the vertical planes indicated by the broken lines 3—3 of Fig. 2 looking in the direction of the arrows.

Fig. 4 shows a plan view partially broken away of the sedimentation apparatus shown in Fig. 1.

Fig. 5 shows a vertical sectional view of a composite construction.

Fig. 6 shows a plan view taken as on the plane indicated by the line 6—6 of Fig. 5 looking in the direction of the arrows.

Fig. 7 shows a vertical sectional view similar in many respects to the construction shown in Fig. 5 but shows a modification.

Fig. 8 shows a horizontal view taken as on the plane indicated by line 8—8 of Fig. 7 looking in the direction of the arrows.

Fig. 9 shows a vertical view taken as on the plane indicated by line 9—9 of Fig. 7 looking in the direction of the arrows.

Fig. 10 shows a vertically-extending view similar in many respects to the construction shown in Fig. 7, but shows a further modification.

Fig. 11 shows a horizontal plan view taken as on the plane indicated by line 11—11 of Fig. 10 looking in the direction of the arrows.

Fig. 12 shows a view taken as on the inclined plane indicated by line 12—12 of Fig. 10 looking in the direction of the arrows.

Fig. 13 shows a vertical view of a form similar in many respects to the forms shown in Figs. 5, 7 and 10.

Fig. 14 shows a plan view similar in many respects to the plan view of Fig. 4.

The sedimentation apparatus or settler wherein the present invention is employed has a settling tank or basin 1 providing a sedimentation zone 2 that is defined by a tank bottom or floor section 3, an upstanding boundary or marginal wall 4 and an upstanding hollow central pier 5 the latter of which constitutes part of an influent conduit construction or liquid-feeding means collectively designated as 6. The influent conduit construction delivers the liquid to be subjected to a settling operation into the central portion of the body of liquid undergoing sedimentation within the settling or sedimentation zone 2. The tank is preferably of a round, square or equally symmetrical type. There is provided an effluent launder 7 preferably at and along the marginal portion of the tank having an overflow weir 8 that determines the normal level W. L. of the top surface of the body of liquid undergoing sedimentation within the settling zone. As the level or elevation of the top surface of the body of liquid tends to rise incident to a feed of incoming liquid to be treated, there is a consequent flow of supernatant liquid from the upper portion of said body over and past said overflow weir into the launder 7 and therefrom through the outflow pipe 9. The effluent launder and the outflow pipe just mentioned are sometimes referred to as a supernaant liquid withdrawal means.

The apparatus is shown to have sediment impelling or raking mechanism 10 of the Dorr type turnable about a vertically-extending axis. Said movable raking mechanism derives support from the pier, in fact, it is turnable about the upstanding hollow pier 5 as an axis and it is entirely supported from the pier through the medium of a stationary member 11 of a turntable construction collectively designated as 12. This stationary turntable member 11 provides in effect a turntable base and is located at the top of a liquid-distributing cage construction 16 provided at or constituting the upper part of the hollow pier 5 as will hereinafter more fully appear.

The stationary member or turntable base 11 has a raceway 13 thereupon the latter of which is located above the normal level W. L. of the liquid within the tank and thereupon there are carried anti-friction members such as a series of balls 14 upon which as a series there is a directly-supported horizontally-movable turntable member 15 constituting the turnable member of the turntable construction 12.

According to the construction illustrated, the turnable turntable member 15 is embodied in and constitutes an essential supporting element or carrying part of the movable raking or impelling mechanism 10. The mechanical assemblage which includes or provides the sediment impelling mechanism as well as the movable carrying part just mentioned and any and all intermediate structural members may be referred to as a horizontally-turnable raking assemblage. The horizontally-turnable assemblage has or embodies a large driven gear 17 which is sometimes referred to as a bull or ring gear. This large gear 17 may be viewed as an essential part of the horizontally-turnable member 15. It is driven from a stationary motor at 18 through the medium of a speed reducing and power transmission mechanism at 19. The motor and speed reducing mechanism both derive support preferably—but not necessarily entirely—from the center pier 5, as for example according to the disclosure of the Scott Reissue Patent No. 20,072 the reissue date of which is August 18, 1936 or the Keefer et al. Reissue Patent No. 19,878 the reissue date of which is March 3, 1936.

The apparatus shown has a walkway 20 which derives its support from the marginal wall of the tank on the one hand and from the centrally-located stationary pier on the other hand. By this walkway access is readily had to the motor and other mechanisms installed at and supported from the centrally-disposed pier 5.

The raking mechanism 10 or the horizontally-turnable raking assemblage has by preference sediment impelling means which comprise raking arms 21 having inclined raking blades 22 depending therefrom. The blades are disposed immediately over the bottom of the tank and function incident to the turning of the assemblage about a vertically-extending axis, to wit, about the center pier 5, to effect a raking and collecting of sedimented material from diverse sections of the tank bottom and a transferring or transference of the raked and collected material to a sediment discharge section provided at 23 in the bottom of the tank. The rake-carrying-arms 21 derive their support from a cage or body structure 24 that is rigidly connected to and depends from the horizontally-turnable member 15 of the turntable construction. More specifically stated the rake-carrying-arms are supported so that they are carried by and extend from the lower portion of the depending cage or body structure 24. The discharge section which is provided at 23 is in the form of a sediment or solids-receiving sump and is provided with a discharge conduit 25 constituting an essential element of a solids discharge leading from the lower central portion of the tank.

The foregoing is practically a description of the sedimentation unit wherein the invention is employed and it is indicative of the environment wherein the features of construction constituting the present invention are utilized. The present invention may be viewed as primarily revolving about a novel influent feed construction devised for the purpose of realizing and controlling a relatively uniform flow and distribution of incoming liquid into the central portion of the tank and so that there is obtained a relatively uniform flow of the distributed liquids throughout the various radiating sections within the sedimentation zone whereby there results a uniform and progressive settling of settleable solids within the lower portion of the tank and whereby there also results or is yielded a relatively clarified overflow product derived from progressive and uniform flow of supernatant liquid to, over and past the weir of the effluent launder.

Heretofore the influent conduit construction 6 has been described as comprising the hollow upstanding central pier 5 at the upper portion of which there is located the distributing cage 16. This cage or cage construction 16 may be viewed as providing a port-defining section of or for the pier 5.

Reference has also been made to the deflecting feed-well construction, designated as 26, provided by a circularly-disposed series of depending baffle plates or vanes 27 adapted to present to the influent liquid directed thereagainst by the cage a face that is inclined to the direction of flow of said liquid. The vanes are carried from a ring-shaped carrier 28 which is preferably above the general level W. L. of the liquid undergoing sedimentation within the tank. That is, this ring shaped member 28 is at an elevation higher than that of the overflow weir 8 and in turn is carried from suitable supporting members as 29 of Figs. 1 and 4 and in this connection see any of the Figures 5, 7 or 10, or from the members 30 of Fig. 14, and in this connection see also Fig. 13.

The carrying ring 28 of the feed-well construction is in fact supported from the carrying members 29 and 30 as the case may be through the medium of suitable connecting members provided as by the bolts 31 and the nuts 32 and 33. Indeed this bolt and nut construction just referred to provides an adjusting means by which the feed-well construction as a whole can be vertically-positioned from the supporting or carrying arms 29 and 30 as the case may be.

In the instances of the constructions shown in Figs. 5, 7 and 10 the supporting arms 29 may be viewed as part of the turnable horizontally-movable turntable member 15. From this turntable member 15 there is also supported and carried the body or cage portion 24 of the turnable raking assemblage and it will be manifest that the feed-well construction as a whole turns about the vertically-extending axis as and when the raking assemblage turns about the said axis.

The members constituting the deflecting blades or vanes 27 have top flange portions 34 slotted or perforated as at 35. The vanes are supported only from their upper end through the medium of suitable connecting elements as, for example, bolts 36 having nuts designated as 37. The bolts pass through the slots or openings 35 of the top flanges and provide means by which the blades may be adjustably positioned and clamped in respect to the carrying ring 28. From the plan views of Figs. 2, 4 and 14 it will be noted that the deflecting members or vanes 27 have a circular arrangement and are disposed so that the edge portions of said vanes have an overlapping position relative to each other with the result that a direct radial flow from the interior of the feed well is prevented. Because of this arrangement there is realized what may be viewed as a tangential tuyere arrangement. This insures a relatively uniform distribution of liquid from within the feed well into the regions immediately surrounding the same. The tuyère throats or spaces between the vanes can be regulated or varied because of the bolts 36 and the slots or openings 35 of the top flange portions 34 of the vanes.

In the construction as shown these deflecting plates or vanes 27 are provided at the outer ends thereof with inwardly projecting lips 38. These lips 38 aid in effecting the diffusing or uniform distribution of the liquid flowing through the throats or tuyère openings but they are not essential to the realizing of the more important aspects of the invention. There is no connecting ring or supporting structure for the lower portions of these blades and therefore the slot or slit-like openings provided by the vanes are left open and unobstructed at and from the lowermost portions of the vanes up to an elevation above that defined by the normal level W. L., to wit, to an elevation above that of the overflow weir 8.

Reference has heretofore been made to the cage construction at 16 and to the fact that it provides discharge ports or openings. An inspection of Figs. 5, 7, 10 and 13 will make it clear that the depending vanes of the feed-well construction extend to an elevation substantially as low as that, or even lower than that of the port discharge openings as provided by the cage construction. With this arrangement it is being noted that the feed-well construction of Figs. 5, 7 and 10 which is horizontally-turnable functions much the same as that of the feed-well construction of Fig. 13 wherein that construction is stationary and does not turn about a vertically-extending axis. In so far as the present invention is involved it is to be noted that the interior arrangement of either Figs. 5, 7 or 10 could be embodied in and adopted as the interior arrangement of or for Fig. 13.

As to the form shown in Fig. 5 the inflow conduit construction 6 has a horizontally-extending inflow section 40 which leads to and terminates in an enlarged chambered section 41 and from the latter there is a vertically-extending upflow section 42 wherein there is located a set of suitably-supported equalizing baffles or partitions provided by members 43 and 44. These members 43 and 44 are in the form of a cross, as shown in Fig. 6 and subdivide the upflow section into four sub-sections wherein the upflow rate is practically uniform. The enlarged chambered section 41 in effect provides a flow-equalizing or swirl-reducing chamber and these partitions or baffles 43 and 44 serve to maintain an equalized upflow condition for the liquids leaving the chamber 41.

As to the form shown in Fig. 7 there is the horizontally-extending inflow section 40 which leads to and terminates in an elbow section 45. The elbow section is followed by an upflow section 46 that leads from the upper end of the elbow section. In other words, there is a serial arrangement for the parts constituting or providing the horizontal inflow section 40, the elbow section 45 and the upflow section 46. In the elbow and upflow sections 45 and 46 there are provided three suitably supported partition plates or equalizing baffles 47, 48 and 49 each having a lower curved end and a straight or flat vertically-extending section. These equalizing baffles or plates 47, 48 and 49 are relatively uniformly spaced and subdivide the elbow and upflow sections into sub-sections through which there is attained a relatively uniform flow condition. The vertical arrangement of the lowermost end portions of the baffles of Fig. 7 is shown in and by Fig. 9 while the plan arrangement of the upper portion of the baffles is shown in and by Fig. 8.

As to the form shown in Fig. 10 there is a horizontally-extending inflow section 40 and an elbow section 45 of like internal diameter. From the upper end of the elbow section 45 there extends an upflow section the lower portion of which has the same diameter as that of the elbow section. The internal diameters of the upflow section progressively increase in passing toward the top. According to the arrangement of this figure there is a suitably supported main partition or baffle plate 50 having a curved lower end of which the lowermost end portion 51 thereof is disposed somewhat below the horizontal diameter of the elbow section within which it is located, to wit, as is illustrated by Fig. 12. This curved lower end gradually merges into a straight or flat upper plate section 52 whereby the main plate in effect divides the upflow section into two principal sub-sections. These sub-sections are in turn subdivided by flow-equalizing partitions or plates 53 and 54. These partitions 53 and 54 extend vertically and are in effect radially-disposed with respect to the vertically-extending axis of the upflow passageway. These is a tendency for a more direct flow of the solids content in the incoming liquid along the outer curve of the elbow section and this is the reason why the end 51 is disposed below the horizontal diameter of the particular section within which it is located. The purpose of this baffle construction is also to attain uniform upflow conditions through and from the center pier 5.

It will be manifest that any of the conduit forms and any of the partition constructions described in connection with Figs. 5, 7 and 10 can readily be embodied in an arrangement such as that illustrated in and by Fig. 13.

For each of the forms hereof, there is shown a distributing-cage construction embodying a lower horizontally-extending annular ring section 61, an upper horizontally-extending circular plate or ring section 62, circularly-disposed horizontally-spaced vertically-extending supporting rods 63 and vertically-spaced horizontally-extending annular rings 64, 65, 66, 67, etc.

The several parts just referred to are relatively rigidly-connected so as to form a strong and rigid cage construction. It will be noted that the openings of the annular rings 64, 65, 66, 67, etc., to wit, the openings successively designated by 74, 75, 76, 77, etc., progressively decrease in diameter in passing upwardly from the lowermost ring with the result that there is effected a progressive and gradual diversion of the upflow liquid into and through the several port openings provided by the cage. The vertically-extending horizontally-spaced rods may be viewed as providing between them main port openings which are subdivided into vertically-disposed sub-port openings by the vertically-spaced annular rings, or by the dividing section thereof. The result of this construction is a circularly-disposed series of vertically-extending main ports which are subdivided into a vertically-disposed series by the horizontal annular rings or by an equivalent form of vertically-disposed flow-dividing or flow-splitting members.

The composite effect of the flow-equalizing partitions or baffles in the upflow section of the influent conduit construction 6, of the multi-disc diffuser or liquid-distributing-cage 16 just described, and of the feed well constructed as heretofore described in detail is a relatively uniform splitting up and distributing of the incoming liquid within the central portion or central receiving section of the sedimentation zone whereby there follows a relatively uniform and progressively slowing down in the flow movement of the liquid thus delivered until the supernatant liquid slowly and evenly passes the overflow weir 8.

Since the lower edges or end portions of the feed-well vanes are free and unobstructed there is avoided any tendency or likelihood of solids-matter accumulating at or within the slotted portions of the feed well. There can also follow a relatively free and undisturbed flow from within the lower section of the feed well downwardly past the lowermost edges thereof. Since the lowermost end of the slot or slot-like openings of the feed well are left open and unobstructed the feed well may be viewed as self-clearing should an obstruction tend to start.

The tuyère-like openings provided by and between the tangentially-disposed members constituting the vanes of the feed well are preferably left free and unobstructed from the inner portion thereof to the outer portion thereof and also to the lower extremes thereof.

In operation, the incoming liquid to be treated flows along the horizontal section of the feed pipe. The direction of flow is then changed from horizontal to vertical through the medium of the elbow section of the feed conduit whereupon the liquid rises in the vertical section of the feed conduit in the hollow pier. In the vertical section, and possibly the elbow section, the feed encounters partitioning means that sub-divide the conduit into longitudinal compartments. These compartments sub-divide the uprising liquid into a plurality of independent small streams for the purpose of discouraging, if not avoiding, the formation of eddies or currents that would otherwise have a detrimental effect upon the incoming liquid.

The rising liquid next encounters the distributing-cage construction associated with the pier, and particularly the succession of horizontally-disposed annular discs. The bore of the superposed discs progressively decreases in diameter. These discs due to their different diameter of bore, successfully "peel off" or divert annular sections of the upflowing liquid to change the direction thereof from upward vertical flow to horizontal outward flow and to some extent a downward reflected flow. Therefore, the result of encountering these superposed discs is that the upward flowing sub-divided streams are split up and change into a plurality of substantially horizontally-flowing sub-divided streams some portions of which have tendencies to downward deflection.

The effect of this is that the incoming liquid loses a major part of its momentum but enough velocity is retained so that as the sub-divided horizontal streams pass from the distributing cage toward the vertically-disposed deflecting vanes, particles thereof impinge upon those vanes at an angle thereto where, by deflection, such particles are directed in various horizontal outward directions within the horizontal middle part or zone of the settling tank under conditions whereby the incoming particles are thoroughly dispersed in that middle zone at uniform velocities that have been so reduced as not to interfere substantially with sedimentation.

The impinging action of the liquid on the vanes is pertinent because it is the control of the deflection of the feed particles whereby this takes place uniformly in all directions that is an important aspect of this invention because the uniformity of the extent of diffusion and the velocity thereof, as well as the horizontal concentration thereof, contributes to the successful operation of this invention.

The incoming feed can be carefully controlled so that it is diffused radially in substantially all directions at uniform velocities but at the same time the incoming feed being diffused is concentrated in a horizontal middle zone of the settler so that in effect it does not go to the top thereof nor to the bottom.

This invention therefore teaches how to limit the diffusion of new feed to a settler to be concentrated in a horizontal zone while showing how to diffuse the new feed in that horizontal zone under conditions of equal velocity and at such decreasing velocities that sedimentation is facilitated. This is accomplished in the present embodiment by the composite action of the various structures herein described including the distributing cage, the deflecting vanes enclosing the feed well particularly with the arrangement of the vane faces, their angles and the slots or tuyère effects between their adjacent overlapping edges. Each of the various structures has novelty in and of itself and a corresponding advantageous function.

What is claimed is:

1. A sedimentation unit comprising in combination a settling tank; an influent feeding means that includes a conduit construction having a low inflow section, a vertically-extending upflow section provided with discharge ports that deliver into the upper central portion of the tank, and an elbow section intermediate and connecting the aforementioned sections; and a system of plates having concentrically-curved lower portions and paralleling flat upper portions and arranged so that the curved lower portions are located within the elbow section while the paralleling flat upper portions are within the vertically-extending upflow section.

2. A sedimentation unit having a settling tank provided with an influent feeding means that includes a conduit construction having a low inflow section, a vertically-extending upflow section provided with discharge ports delivering into the upper central portion of the tank, and an elbow section intermediate and connecting said sections, and a flow-equalizing construction having a dividing plate provided with a curved lower portion disposed within the elbow section so that the lowermost edge of the curved portion is below the medial flow path of the elbow section and a flat upper portion disposed within and along the medial flow line of the upflow section.

3. A sedimentation unit according to claim 2 of which the flow-equalizing construction in addition to the dividing plate referred to includes sub-dividing plates disposed at the opposite sides of the first mentioned dividing plate and having substantial vertical extent within the upflow section of the conduit construction.

4. In a sedimentation unit, a subsidence tank having a sediment discharge leading from the lower portion thereof, an outflow means that determines the normal level of a liquid therein, and an influent conduit construction comprising a horizontally extending inflow conduit section and a vertically extending conduit section comprehending a lower upflow portion and an upper discharge portion providing horizontally-disposed vertically-extending main ports arranged for delivered liquid into the central portion of a body of liquid normally maintained within the tank; which said vertically extending conduit section is characterized in that it includes a flow dividing means embodying partitions by which the lower upflow portion thereof is subdivided and by which the flow rate is made relatively uniform within and throughout the resulting sub-divided sections, and in that the upper discharge portion comprises vertically-spaced transversely-extending diffusing baffles that subdivide the main ports into vertically-disposed sub-ports.

5. A sedimentation unit comprising a settling tank having an influent conduit construction that comprises a hollow pier having at the upper portion thereof and as a part thereof an influent distributing and load-supporting cage into which the liquid to be subjected to a settling operation flows and from which the liquid is delivered into the liquid holding portion of the tank, an outflow means that determines the normal operative level of the liquid within the tank, and means for removing sediment from the tank, which influent distributing and load-supporting cage is characterized in that it embodies circularly-disposed vertically-extending horizontally-spaced supporting members providing between them horizontally-disposed vertically-extending main ports, and in that it has a series of vertically-spaced horizontally-extending annular members rigidly connected to and rigidly connecting the aforementioned vertically-extending supporting members and subdividing the main ports into vertically-spaced sub-ports and also serving to laterally brace the vertically-extending horizontally-spaced supporting members.

6. A sedimentation unit having a settling tank and an influent feeding means therefor including a vertical section having a diffusing cage construction comprising vertically-extending horizontally-spaced members providing between them a series of main discharge ports and vertically-spaced horizontally-extending rings connected to said vertically-extending horizontally-spaced members and subdividing the main ports into vertically disposed series of sub-ports.

7. A sedimentation unit according to claim 6 wherein the diffusing cage construction of the vertical section constitutes part of an upflow section delivering into the tank and as to which vertically-spaced horizontally-extending rings, the lowermost one has the largest interior diameter and the successive upper rings have progressively decreasing interior diameters.

8. A sedimentation unit comprising in combination a settling tank having a bottom and a marginal boundary wall, a settling solids discharge leading therefrom, a marginal effluent launder having an overflow weir determining the normal surface level of the liquid in the tank, an influent conduit construction having a terminal section provided with ports delivering into the central upper portion of the tank, and means for conveying sedimented material to said settled solids discharge, said unit being characterized by an influent deflecting and distributing well structure surrounding but spaced from the aforementioned terminal section and comprising a horizontally-extending carrier ring located at an elevation at least substantially as high as that of the normal level of the liquid as determined by the effluent launder, and horizontally-spaced circularly-arranged vane members carried by said ring, extending downwardly into the liquid within the tank and providing between them vertically-extending slot-like tuyères that are open at the bottom as well as at the peripheral sides.

9. A clarifier comprising a settling tank provided with an influent conduit construction including a horizontally-extending inflow section and a vertically-extending delivery section having therein flow dividing means for equalizing the flow velocities within various portions of the delivery section, said vertically-extending delivery section also having a diffusing cage construction comprising horizontally-spaced vertically-extending members between which there are provided influent discharge ports and vertically-spaced horizontally-extending rings connected to said vertically-extending members and subdividing the influent discharge ports into a plurality of vertically-disposed sets of smaller diffusing ports that are located so as to deliver the influent within the tank; said clarifier also embodying a stilling well construction which is annular in cross-section of which the interior diameter is substantially greater than that of the exterior diameter of the aforementioned diffusing cage and comprising vertically-extending horizontally-spaced tangentially-disposed baffle strips that extend downwardly within the tank to an elevation lower than that for the lowermost portions of the influent discharge ports.

10. A sedimentation unit comprising in combination a settling tank; an influent conduit construction having a lower inflow section, an upper upflow section provided with discharge ports delivering into the tank, and an intermediate elbow section connecting the aforementioned sections; and flow equalizing means disposed in the passageway provided by said conduit construction and embodying a flow-dividing plate provided with a curved lower portion disposed in said intermediate elbow section and with a flat upper portion disposed within said upflow section.

GEORGE E. HUBBELL.
CHARLES H. SCOTT.
GEORGE M. DARBY.